2,960,801
METHOD OF MAKING A SEMICRYSTALLINE CERAMIC BODY

Charles B. King and Stanley D. Stookey, Corning, N.Y., assignors to Corning Glass Works, Corning, N.Y., a corporation of New York No Drawing. Filed Nov. 12, 1958, Ser. No. 773,182

2 Claims. (Cl. 49—77)

This invention relates to the production of semicrystalline ceramic bodies by the controlled crystallization of glass bodies by heat treatment and particularly to a novel method of making a semicrystalline body having a relatively high modulus of rupture, sometimes called flexural strength, from a glass body comprising primarily $SiO_2$, $Li_2O$, $Al_2O_3$ and $TiO_2$, and optionally containing up to 5% of other compatible oxides, the $TiO_2$ functioning to promote crystallization.

Glass bodies having such compositions may be converted by suitable heat treatments to semicrystalline bodies which are characterized in general by higher moduli of rupture, higher deformation temperatures and lower linear thermal expansion coefficients than those of the original glass bodies, as is shown in the pending United States application of Stanley D. Stookey Serial No. 718,398 filed March 3, 1958. Substantial variations in composition and/or heat treatment cause substantial variations in the moduli of rupture, expansion coefficients and amount of deformation of the semicrystalline products and it is sometimes necessary to comprise and accept less than the optimum value of one or more properties in order to obtain a desired optimum value of another property. For instance a heat treatment which will produce a body having a maximum modulus of rupture will cause a deformation of the body sufficient to make it unsuitable for purposes requiring a relatively small tolerance in dimensions or a close fit with other parts. On the other hand, a heat treatment which will crystallize the same glass body without appreciable deformation will not produce a modulus of rupture and expansion coefficient suitable for another purpose without becoming economically impractical with respect to fuel cost, time and overhead expense.

It is an object of this invention to provide a method whereby the above-mentioned difficulties can be overcome and a semicrystalline body of the type described above having a specific composition and having a high modulus of rupture and a low expansion coefficient can be produced with an amount of distortion which, although too great for purposes requiring close tolerance of dimensions, is not objectionable for purposes where distortion is not so great a problem, and particularly for the production of flat ware, such as sheets and plates, or other articles which can be adequately supported during their heat treatment or which can subsequently be ground to accurate dimensions.

Specifically the method comprises heat treating a glass body consisting essentially of about 71% $SiO_2$, 2.5% $Li_2O$, 18% $Al_2O_3$, 4.5% $TiO_2$, 3% MgO and 1% ZnO, plus minor constituents as explained below, by heating it at about 5° C. per minute to about 800° C., holding it at about 800° C. for about 1 hour, further heating it at a rate of about 5° C. per minute to 1150° C.–1175° C. and holding it at 1150° C.–1175° C. for about 4 hours.

The above-mentioned composition was melted in a continuous tank furnace at about 1600° C. In order to maintain oxidizing conditions in the tank during melting, small amounts of $NaNO_3$ and $As_2O_5$ were included in the batch as oxidizing agents, the $As_2O_5$ also functioning as a fining agent. Other conventional oxidizing and fining agents can be substituted, if desired. The residual $Na_2O$ and $As_2O_3$ remaining in the glass amount to about 1.5% of the total composition and have no appreciable effect on the properties of either the glass or its semicrystalline product. For convenience and facilitation of expression, therefore, the composition is expressed in round figures by omitting such minor constituents and rounding off the remaining constituents as is indicated above.

The modulus of rupture preferably is measured in the conventional manner by supporting individual rods of the semicrystalline product about ¼ inch in diameter and 4 inches long on 2 knife edges spaced 3½ inches apart and loading them on 2 downwardly acting knife edges about ¾ inch apart and centrally spaced from the lower knife edges until breakage of the rods occurs. To ensure comparable results the rods are first abraded by being rolled in a ball mill for 15 minutes with 30 grit silicon carbide. Five or more rods are thus tested to obtain the average value which is calculated in p.s.i. Abraded rods of glass in general, when treated and measured in this manner show moduli of rupture ranging from 5000 to 6000 p.s.i.

The method of measuring the linear thermal expansion coefficient of glasses and semicrystalline ceramics is so well known as to require no discussion here. The measured expansion coefficient of the above-described glass composition in the vitreous state is about $34 \times 10^{-7}$ per ° C. between 0° and 300° C.

In comparison with the above values for the modulus of rupture and the expansion coefficient of the glass, the stated heat treatment of the above-described glass will produce semicrystalline bodies having an average modulus of rupture of at least 21,000 p.s.i. and an expansion coefficient of $0-10 \times 10^{-7}$ per ° C. between 0° and 300° C.

The amount of deformation which will be produced by a specific heat treatment schedule during conversion of a body of the above-described glass to a semicrystalline body is most readily measured by using rods of the glass ¼ inch in diameter and 5 inches long and subjecting them to said schedule while they are mounted on refractory supports spaced 4 inches apart. Measurement of the bow or sag of the rod between the supports as a result of the heat treatment is made by means of a gauge consisting of knife edges 4 inches apart and a dial gauge with a knife edge tip mounted midway between and below the knife edges. The sagged rod is placed on the knife edges of the gauge convex side down, the knife edges contacting as closely as possible the points which were in contact with the refractory supports during the heat treatment. The deflection of the mid point of the convex side of the rod from the plane of the two knife edges of the gauge is indicated on the dial in mils.

The use of a preliminary holding temperature or range is essential for the proper initiation of crystallization. It is believed that in such temperature range sub-microscopic crystallites or nuclei segregate throughout the glass and slowly increase in size with time and temperature and that such nuclei constitute the beginning of the formation of an interlocked crystalline structure or network of high melting point which ultimately will support the body and minimize its deformation as the temperature is further increased.

We have discovered that, in order to obtain the maximum modulus of rupture together with the minimum expansion coefficient, the preliminary holding range for the above-described glass is approximately 775°–825° C. A lower modulus of rupture together with a higher expansion coefficient results from the use of a preliminary holding temperature either below or above such range. Holding for more than about 1 hour in such range tends to lower the modulus of rupture. The best results for the present purpose, therefore, are obtained by holding the glass at about 800° C. for about 1 hour.

The conversion of the glass body to the desired semicrystalline state is far from complete at this stage and further heating and holding at a higher temperature is required. During such subsequent heat treatment we have found that the higher the temperature up to about 1150° C. the greater will be the modulus of rupture. The use of temperatures above 1150° C. and up to 1200° C. results in higher deformation which is not objectionable for ware that can be properly supported. Holding the body at 1150°–1175° C. for about 4 hours is the most economically practicable schedule for converting it to the desired final semicrystalline state.

The rate at which the temperature is raised up to the preliminary and the final holdings ranges has a substantial effect on the properties of the semicrystalline product and we have found that the maximum modulus of rupture and minimum expansion coefficient are obtained with a rate of about 5° C. per minute.

The method set forth above constitutes the best method for commercial use wherein the desired result is obtained in a minimum time with the lowest practical amount of overhead expense and fuel cost. In another application filed concurrently therewith, Serial No. 773,183 by Raymond O. Voss, there is described and claimed a method of heat treating a glass body without substantially deforming it while converting it to a semicrystalline body having an average modulus of rupture when abraded of at least 13,000 p.s.i.

What is claimed is:

1. The method of heat treating a glass body consisting essentially of about 71% $SiO_2$, 2.5% $Li_2O$, 18% $Al_2O_3$, 4.5% $TiO_2$, 3% MgO and 1% ZnO by weight to convert it to a semicrystalline body having an average modulus of rupture when abraded of at least 21,000 p.s.i. and a linear thermal expansion coefficient about $10 \times 10^{-7}$ per ° C. or less between 0° C. and 300° C., which comprises heating the glass body at a rate of about 5° C. per minute to about 800° C., holding it at about 800° C. for about 1 hour, further heating it at a rate of about 5° C. per minute to 1150°–1200° C. and holding it at 1150°–1200° C. for about 4 hours and thereafter cooling.

2. The method of heat treating a glass body consisting essentially of about 71% $SiO_2$, 2.5% $Li_2O$, 18% $Al_2O_3$, 4.5% $TiO_2$, 3% MgO and 1% ZnO by weight to convert it to a semicrystalline body having an average modulus of rupture when abraded of at least 21,000 p.s.i. and a linear thermal expansion coefficient about $10 \times 10^{-7}$ per ° C. or less between 0° C. and 300° C., which comprises heating the glass body at a rate of about 5° C. per minute to about 800° C., holding it at about 800° C. for about 1 hour, further heating it at a rate of about 5° C. per minute to 1150°–1175° C. and holding it at 1150°–1175° C. for about 4 hours and thereafter cooling.

References Cited in the file of this patent

UNITED STATES PATENTS

| | | |
|---|---|---|
| 1,394,296 | Fisher | Oct. 18, 1921 |
| 1,893,382 | Watson | Jan. 3, 1933 |
| 2,691,855 | Armistead | Oct. 19, 1954 |